June 15, 1948.   P. DE MATTIA   2,443,554
APPARATUS FOR MOLDING PLASTICS
Filed April 6, 1944
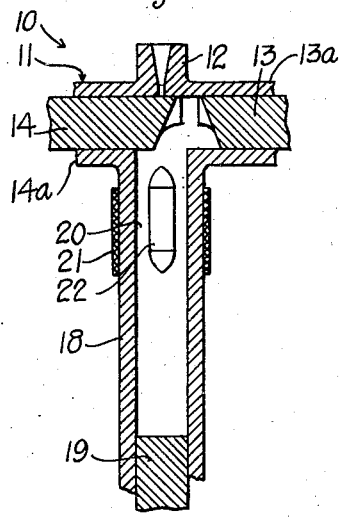
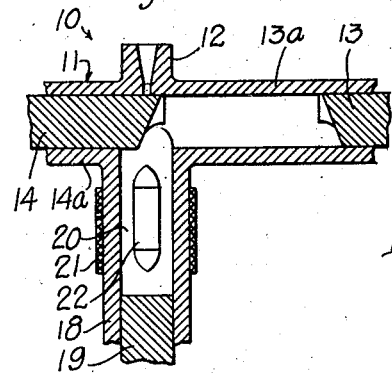
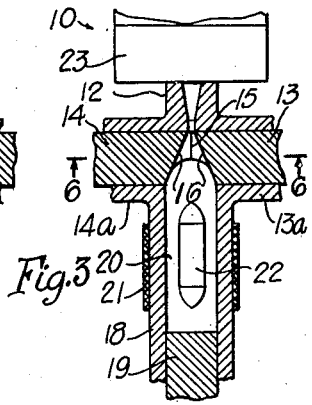
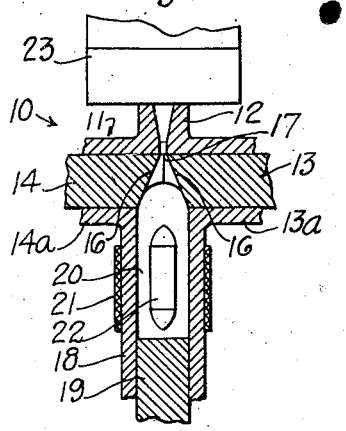
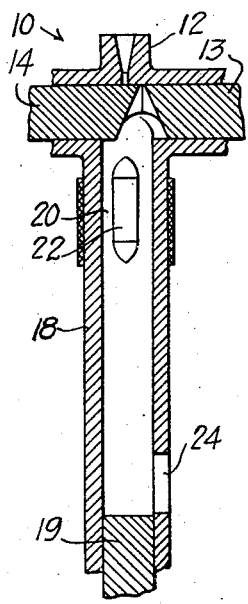
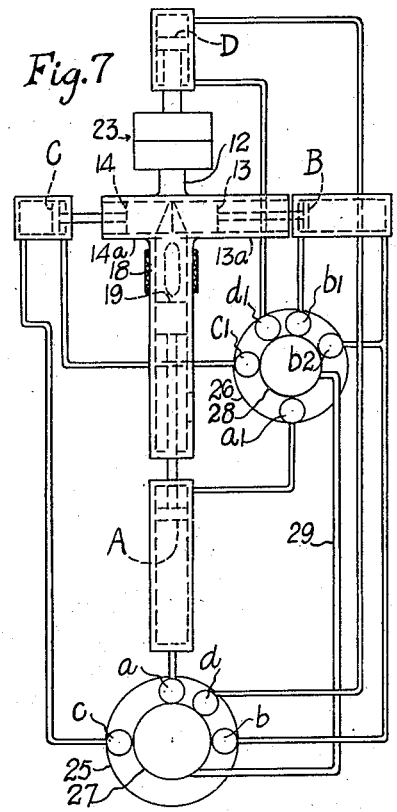
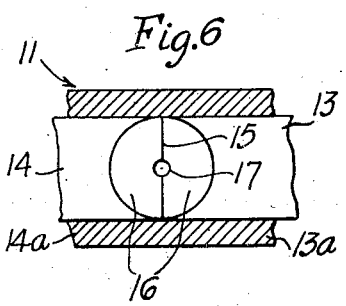
INVENTOR.
Peter De Mattia
BY
Louis Shumacher, Atty.

Patented June 15, 1948

2,443,554

UNITED STATES PATENT OFFICE 2,443,554

APPARATUS FOR MOLDING PLASTICS

Peter De Mattia, Clifton, N. J.

Application April 6, 1944, Serial No. 529,739

5 Claims. (Cl. 18—30)

This invention relates to improvements in apparatus for molding plastics including thermosetting and true thermoplastic materials.

One object of the invention is to provide an improvement in apparatus for molding large charges of plastics whereby premature setting of thermosetting materials is avoided, and "burning" of true thermoplastics is avoided.

More specifically, it is an object of the invention to provide apparatus for the die or extrusion molding of relatively large charges of plastics, which may be one to one hundred pounds or even larger. For this purpose the plastic may be fed to the heating cylinder by a series of small strokes of one or more pistons or by a single long stroke of a piston. The accumulated large charge of plastic must then be heated to become substantially uniformly fused for a rapid ejection into a die. In practice, it is difficult if not impossible to heat a large charge without heating some parts of the charge for too long a time or producing an excessive temperature therein. Such over-heating results in premature setting of thermosetting materials or "burning" of true thermoplastics. This has posed a problem which has not been solved heretofore, to my knowledge. With thermosetting materials, the die is heated and imparts considerable heat to the heating cylinder by contact therewith, thus aggravating the problem. It has been proposed to overcome this difficulty by water cooling the injection nozzle of the heating cylinder, but this has been found to be unsatisfactory.

It is, therefore, an object of the invention to avoid these difficulties and to provide apparatus for the molding of large charges of plastics.

The utility of the invention is best exemplified in the treatment of thermosetting materials, in which an increase in the temperature or in the time of heating may cause premature setting. Hence, even if only very small quantities of such materials suffered premature setting they would become so hard that they could not be ejected, not could they be eliminated by further heating. They would clog the apparatus which would have to be shut down and cleaned. I perceived, therefore, that it was essential that virtually every particle of such plastic used in a cycle be ejected in that particular cycle so that it may not be heated too long before injection into the mold.

The difficulty mentioned was increased in attempting to mold large articles of thermosetting materials because the following factors were involved: First, the large plastic charge had to be heated relatively slowly to assure uniform fusion without overheating or premature setting; according to the best practise such heating is done in a chamber having a flow dividing heating member or flow constricting means relatively close to the outlet or injection port for the mold. Second, the feed of plastic from the heating chamber to the injection port is dependent upon the resistance of unfused as well as fused plastic and is therefore rather high and varies with different plastics; therefore the flow is inherently limited to relatively low speeds for good performance without undue wear on the machine. Third, the charge should be fed to a reservoir or storage chamber and thence to the mold at relatively high velocity for rapid, economical molding and uniform setting of the plastic in different parts of the mold (by further heating for thermosetting plastics and by chilling for true thermoplastics). Fourth, in the cycle involved, the fused plastic must be ejected into the mold from the storage chamber without leaving any residue or adherent plastic for another cycle and consequent overheating; this must be accomplished without using valves or other moving parts which may require that they in turn be cleaned of residue or adherent plastic.

It is therefore an object of the invention to furnish an improvement in the art which, on the basis of the factors involved, shall solve the difficulties mentioned and assure ejection of the residue plastic after it has been heated for a certain time or within a given cycle.

Another object of the invention is to furnish an improvement in the art whereby one flow path for stored plastic merges into another whereby the relatively fresh plastic in the latter cleans a feeding instrumentality of the former of residue plastic for ejecting such residue into a mold.

More specifically, the invention provides for the feeding of the stored plastic through the injection port, and the disposition adjacent to the latter of the residue of such feed, followed by a plastic flow from the fusing chamber direct to the injection port to pick up and eject the residue for a complete ejection of the stored plastic and of the advance highly heated plastic at the fusing chamber.

Another object of the invention is to provide an improvement in the art whereby the reservoir chamber, or at least the piston thereof cooperates with adjoining parts of the apparatus to furnish a relatively low resistance tapered passage to the outlet orifice for the follow-up flow of plastic from the heating cylinder; and preferably there may be a valve for said orifice sufficiently enlarged or formed like a piston so that its working face may cooperate with that of the reservoir piston to provide a conoidal passage for the plastic to said orifice; the method involved thus providing for a change in the flow contour upon expulsion of the plastic from the reservoir so that an alined flow from the high resistance heating cylinder can occur through a convergent region forming an entrance to the orifice.

Other objects and advantages of the invention will become apparent as the specification proceeds.

With the aforesaid objects in view, the invention comprises the novel features, combinations and arrangements of parts hereinafter described in their preferred embodiments, pointed out in the subjoined claims, and illustrated in the annexed drawing, wherein like parts are designated by the same reference characters throughout the several views.

In the drawing:

Figure 1 is a diagrammatic, fragmentary horizontal sectional view showing a device embodying the invention and illustrating the first step of the cycle according to my novel process.

Fig. 2 is a similar view showing a substantial part of the plastic charge transferred to the reservoir or second location from the heating chamber, completing the operation begun in Fig. 1.

Fig. 3 is a similar view with the die or mold in position and the plastic ejected into the die by the advanced piston at the second location.

Fig. 4 is a similar view with the primary piston advanced from its position of Figs. 2 and 3 to eject an additional charge of plastic to the die.

Fig. 5 is a similar view with the ejection nozzle closed as in Figs. 1 and 2 and showing the primary piston fully retracted for loading another charge to begin another cycle.

Fig. 6 is an enlarged sectional view taken on line 6—6 of Fig. 3.

Fig. 7 is a schematic view showing an apparatus embodying the invention with particular reference to the actuator means for the various moving parts.

The advantages of the invention as here outlined are best realized when all of its features and instrumentalities are combined, but, useful embodiments may be produced involving less than the whole.

It will be obvious to those skilled in the art to which the invention appertains, that the same may be incorporated in several different constructions. The accompanying drawing, therefore, is submitted merely as showing a preferred exemplification of the invention.

Referring in detail to the drawing, 10 denotes an apparatus embodying the invention and illustrating my novel methods of making large plastic articles by molding in a die or by extrusion through a die, with the use of large charges of plastic, weighing one to one hundred pounds or more, without causing premature setting of thermosetting materials or "burning" of true thermoplastics. The apparatus 10 may include a casing having a first cylinder 11 having a lateral outlet nozzle or orifice at 12 located intermediate the ends of the cylinder 11. Disposed in the latter at opposite sides of the nozzle are pistons 13 and 14 which may be independently reciprocable, except perhaps as in Fig. 5 hereinafter described, in which piston 14 may directly push piston 13 rightward, and in Fig. 4 in which piston 13 may move piston 14 leftward by exerting pressure on the plastic. Hence the cylinder 11 may be regarded as comprising individual cylinders 13a and 14a for the respective pistons. The opposed working faces of these pistons are adapted to accurately contact each other along a plane 15 which may be at right angles to the pistons. Formed in the working face portions of the pistons are tapered recesses 16, see Fig. 6, which conjointly provide a generally conoidal central orifice or entrance adapted to aline with the nozzle 12 as in Figs. 3 and 4; this conoidal entrance is centrally split along the plane at 15, and at its small end 17 is substantially equal in diameter with the orifice of the nozzle 12. Intersecting the cylinder 11 at an angle is a second cylinder 18 whose internal diameter may be equal to that of the large end of the said conoidal entrance. In this cylinder is a reciprocating piston 19 operative independently of the others but capable of causing retraction of piston 13 as in Figs. 1 and 2 by exerting pressure on the plastic. A portion of the cylinder 18 adjacent to the cylinder 11 affords a heating chamber 20 for melting or fusing the plastic. Heat may be supplied to this chamber in any suitable manner as by an external annular heating element 21, and by an internally heated element 22. The latter may be constructed and arranged as disclosed in my Patent No. 2,271,063, issued January 27, 1942, which is incorporated herein by reference. Thus the element 22 is centrally located and is connected to the cylinder 18 by a series of radial webs, its function being to divide and thin down the flow for a rapid and uniform heating of the plastic as it passes through the heating chamber 20. Incidentally, this element 22 causes considerable resistance to the flow of the plastic, and this resistance is a serious factor where a large charge of plastic must be ejected with considerable rapidity into a die. A similar heating element may be provided for the reservoir 13a, but the same may be heated solely by the plastic, and may be insulated if necessary. Finally, it may be noted as to the apparatus 10 that while the piston 19 is a primary and the piston 13 a secondary or transfer or reservoir piston, the piston 14 is primarily a valve for opening the nozzle 12 for communication with the die 23 as in Figs. 3 and 4 and for closing said nozzle as in Figs. 1, 2 and 5. In that respect any suitable thin plate valve might be used, with the piston 13 and its recess 16 cooperating with an adjoining wall or part of the apparatus to afford a suitable entrance to the nozzle 12, but the best results are obtained, and in the simplest manner with the apparatus disclosed.

The process embodying the invention will now be disclosed. After the cylinder 18 has been loaded with the relatively large charge of plastic, supplied thereto in any feasible manner, the cycle may be said to start at Fig. 1. The primary piston 19 advances with a powerful pressure, while the valve piston 14 is in closing position, and the secondary piston 13 retracts by operation of an actuator or by the pressure of the plastic itself. In Fig. 1 this retraction has started, and it continues until substantially all of the large charge has been received in the transfer chamber 13a as in Fig. 2. As the plastic flows through the heating chamber 20, it is progressively fused, and in the transfer chamber 13a little or no heat may be supplied, so that the temperature in the latter may be somewhat less than at the heating chamber 20. This avoids any premature setting or "burning" of plastic. It may be added that the conoidal face at 16 assists in imparting axial pressure to the secondary piston, which is useful because of the high viscosity of the plastic. No entrapment of air occurs, and any air particles in the plastic flow backward and out past the piston 19 because of the high resistance interposed by the element 22 as previously mentioned. Hence the molded article will be free of blemishes caused by entrapped air.

According to the next step of the process, the primary piston 19 has temporarily come to rest as in Fig. 3 and the secondary piston 13 advances. This immediately causes retraction of the piston valve 14 either as a result of an increased pressure on the plastic or as a result of a diminished resistance of the piston valve. While the primary piston is held rigidly stationary, the secondary piston now expels all the plastic in the transfer chamber 13a through the nozzle 12 into the die 23 which has moved into communication with the nozzle. Such expulsion of a large quantity of plastic may occur with great rapidity because the resistance to flow is substantially less than in the cylinder 18. During this expulsion the recesses 16 form the conoidal entrance in true alinement with the nozzle 12.

According to the next step, and while the pistons 13, 14 are held rigid, the primary piston 19 advances to eject an additional or follow-up charge or quantity of plastic into the die to complete the article. If the total weight of the article be about 5 to 100 pounds or more, this final ejection may be about 1 or 2 pounds or more. This final ejection is an important feature of the process and is not merely a follow-up injection to take care of shrinkage. Its purpose is to gather up or entrain the residue of the ejection from the reservoir or transfer chamber 13a. Such residue may be adherent to the piston 13 and may remain in the recesses 16. It is susceptible to "burning" or premature setting since it has remained for some time in heated condition in the transfer chamber, representing the very first part of the charge received by that chamber. Accordingly, the final ejection by the piston 19 serves to eject that residue and serves to clean the recesses 16. Also this final ejection by piston 19 represents plastic which has been heated while the charge of the transfer chamber was being ejected, and hence it is desirable to expel it without further delay into the die.

Upon completion of the step indicated in Fig. 4, the pistons 13, 14 are moved rightward, so that the piston 14 closes the nozzle 12. This may be effected in a simple manner by releasing piston 13 at least in part and giving the valve piston a powerful impulse to move it and the piston 13 to the position of Fig. 5. The die 23 is removed and the primary piston retracted to open the inlet 24 so that the cylinder 18 may receive another charge, in readiness for the succeeding step of Fig. 1 to produce another article. The die 23 may represent a mold or extrusion die. The temperatures used may vary with the plastic; thus the temperatures in the heating chamber 20 may be less for thermosetting than for true thermoplastics. With the latter, the die 23 may be water cooled, and with the former it may be heated.

The actuator means for the performance of the foregoing process and for operating the apparatus may be quite obvious, and may be mechanical or hydraulic with timing or electrical stop and start controls responsive to the pistons or to other controlling devices. However, in order to show one possible arrangement, reference is now briefly had to the simplified schematic view of Fig. 7. Power cylinders are provided for the pistons and for the die, these being preferably identified by their pistons A, B, C and D for the respective members 19, 13, 14 and 23. In the case of the die, its piston D may cause opening and closing of the die as well as movement of the die toward and away from the nozzle 12. A high pressure reservoir 25 may be provided and a pressure reservoir 26 having a pressure less than that of the reservoir 25. Different ends of the cylinder of piston A may be connected respectively to reservoirs 25 and 26 as by valves $a$ and $a1$. Different ends of the cylinder for piston B may be connected respectively to reservoirs 25 and 26 as by valves $b$ and $b1$. Different ends of the cylinder for the piston C may be connected respectively to the reservoirs 25, 26 as by valves $c$ and $c1$. And finally, different ends of the cylinder for the piston D may be connected to the respective reservoirs 25, 26 as by valves $d$ and $d1$. All of the valves $a$, $b$, $c$ and $d$ may be mechanically or electrically controlled for timing and other action as by any suitable device 27; and similarly all the valves $a1$, $b1$, $b2$, $c1$ and $d1$ may be controlled by any device 28. The devices 27, 28 may be interconnected or coordinated mechanically or electrically as indicated by a connection 29, to assure proper timing, and one of the devices 27 or 28 may represent a master control. Such control may be coordinated with or supplemented by suitable well known devices including contact switches at the pistons or other moving parts to assure precise operation, and may in fact control or operate in lieu of timing devices, so that the travel of the plastic itself may constitute the dominant timing factor.

In operation, for Fig. 1, valves $a$ and $a1$ may be fully open so that the piston A advances, with pressure exiting from the front of piston A to reservoir 26. During this time valves $c$, $c1$ and $b$ are closed, but valves $b1$ and $b2$ are open at least in part so that valve piston 14 is held rigid while piston 13 is retracted by pressure of the plastic against which it may offer some resistance. Since the die 23 is stationary, valves $d$ and $d1$ are closed.

Next the valves $a$, $a1$ are closed, so that the piston 19 is stationary. Simultaneously, the valve $b$ is opened while valve $b2$ is closed causing advance of the piston 13 to the position of Fig. 3. Since the piston 14 is retracted from the position in Fig. 2 by the force of piston 13, the valve $c1$ is opened while valve $c$ may be moved to a restricted bleeding position so as to cut off the pressure from reservoir 25 while permitting such bleeding from the rear of its piston C as to cause the piston 14 to offer a resistance while receding. Instead of the bleeding at valve $c$, an additional pipe line may be employed to reservoir 26 with a valve like that at $b2$, to cause operation as in the case of the piston B. With the initiation of the above operations, valves $d$ and $d1$ are opened so that the die 23 moves into operative relation and is constantly pressed against the nozzle 12.

Then the valves $b$ and $b1$ and $c$ and $c1$ are closed so that the pistons 13, 14 are rigidly stationary, and valves $a$ and $a1$ opened to cause the piston 19 to advance from its position in Fig. 3 to that in Fig. 4.

Finally valves $c$, $c1$ are opened to cause the piston C to advance under pressure from 25 with liquid in advance of the piston bleeding into 26 until piston 14 reaches the position as in Fig. 5. Simultaneously, valves $b1$ and $b2$ open so that the piston 13 may recede under the force of piston 14, as described for the position of Fig. 1. Simultaneously valve $a$ is closed and moved to a pressure bleeding position, while valve a1 is opened so that pressure from 26 causes retraction of the piston A and hence of piston 19 to the filling position. At the same time valve d closes but moves to bleeding position, with valve d1 remaining open so that pressure from 26 will move the die to open or inoperative position away from nozzle 12. Obviously in the case of pistons A and D, the higher pressure in reservoir 25 may be used to cause retraction by suitably switching the connections with multi-way valves between their cylinders and the reservoirs 25, 26, but the simplified showing herein is sufficient to illustrate the operation involved, with the use of valves such as a, c and d movable to open and closed positions and to an intermediate position in which they may bleed liquid to some other reservoir or to a drain pipe. If desired, the reservoirs may be interconnected to circulate the liquid, as with the aid of suitable pumps, to avoid any waste, but this being conventional practice, is not shown herein.

I claim:

1. Molding apparatus for plastics including a first cylinder having an outlet orifice in a side wall thereof intermediate of the ends of the cylinder, a second cylinder communicating with the first cylinder at an angle thereto and being in approximate alinement with the outlet orifice, pistons in the first cylinder at opposite sides of the outlet orifice and having working faces confronting each other, said pistons each having a recess at its working face of the shape of a portion of a generally conoidal surface, the recesses of the pistons registering with each other when the pistons are in contact with each other to provide a passage converging from the second cylinder to the outlet orifice, and a piston in the second cylinder.

2. Molding apparatus according to claim 1 wherein means is provided for advancing one piston in the first cylinder to move past and to thus close the orifice and for thereafter advancing the piston in the second cylinder with the other piston in the first cylinder retracting so as to afford a reservoir for receiving plastic, and for thereafter advancing the said other piston in the first cylinder with its opposed piston retracting to uncover the orifice for ejecting the plastic, with the pistons in the first cylinder being finally positioned to produce said convergent passage alined with the orifice, and for thereafter causing an advance of the piston in the second cylinder for a follow-up charge of plastic through the alined convergent passage.

3. Molding apparatus including a first cylinder having an outlet orifice in a side wall thereof intermediate of the ends of the cylinder, a second cylinder communicating with the first cylinder at an angle thereto and in approximate alinement with the outlet orifice, pistons in the first cylinder at opposite sides of the outlet orifice and having working faces confronting each other and being at different obtuse angles to the axis of the first cylinder, said working faces cooperating with each other to form an entrance convergent from the second cylinder to the outlet orifice, and a piston in the second cylinder.

4. Molding apparatus including a first cylinder having an outlet orifice in a side wall thereof intermediate of the ends of the cylinder, a second cylinder communicating with the first cylinder at an angle thereto and in approximate alinement with the outlet orifice, pistons in the first cylinder at opposite sides of the outlet orifice and having working faces confronting each other and being at different obtuse angles to the axis of the first cylinder, said working faces cooperating with each other to form an entrance convergent from the second cylinder to the outlet orifice, and a piston in the second cylinder, and means for advancing one piston on the first cylinder to move past and to thus close the orifice and for thereafter advancing the piston in the second cylinder with the other piston in the first cylinder retracting so as to afford a reservoir for receiving plastic, and for thereafter advancing the said other piston in the first cylinder with its opposed piston retracting to uncover the orifice for ejecting the plastic, with the pistons in the first cylinder being finally positioned to produce said convergent passage alined with the orifice, and for thereafter causing an advance of the piston in the second cylinder for a follow-up charge of plastic through the alined convergent passage.

5. Molding apparatus according to claim 4 wherein the orifice closing piston and its companion piston in the first cylinder have end abutment with each other so that the companion piston moves the orifice closing piston to a retracted position in which the orifice is opened coincident with the formation of the alined convergent passage.

PETER DE MATTIA.

REFERENCES CITED

The following references are of record in the file of this patent:

UNITED STATES PATENTS

| Number | Name | Date |
|---|---|---|
| 2,111,857 | Jeffery | Mar. 22, 1938 |
| 2,137,764 | Wagner | Nov. 22, 1938 |
| 2,156,396 | Macklin | May 2, 1939 |
| 2,202,140 | Burroughs | May 28, 1940 |
| 2,207,426 | Bailey | July 9, 1940 |
| 2,252,107 | Weida | Aug. 12, 1941 |
| 2,268,026 | Ernst et al. | Dec. 30, 1941 |
| 2,332,679 | Tucker | Oct. 26, 1943 |
| 2,349,176 | Kopitke | May 16, 1944 |
| 2,359,840 | Goessling | Oct. 10, 1944 |

FOREIGN PATENTS

| Number | Country | Date |
|---|---|---|
| 501,277 | Great Britain | Feb. 21, 1939 |